(12) United States Patent
Klunder

(10) Patent No.: US 7,494,632 B1
(45) Date of Patent: Feb. 24, 2009

(54) MERCURY SORBENT DELIVERY SYSTEM FOR FLUE GAS

(75) Inventor: Edgar B. Klunder, Bethel Park, PA (US)

(73) Assignee: The United State of America as represented by the United States Department of Energy, Washington, DC (US)

( * ) Notice: Subject to any disclaimer, the term of this patent is extended or adjusted under 35 U.S.C. 154(b) by 292 days.

(21) Appl. No.: 11/484,573

(22) Filed: Jul. 12, 2006

(51) Int. Cl.
*B01D 53/64* (2006.01)
(52) U.S. Cl. ........................................ 423/210; 95/134
(58) Field of Classification Search ................ 423/210; 422/168, 177, 180; 95/134
See application file for complete search history.

(56) References Cited

U.S. PATENT DOCUMENTS

| 4,917,862 A * | 4/1990 | Kraw et al. ..................... 422/4 |
| 5,505,766 A * | 4/1996 | Chang .......................... 95/134 |
| 5,948,143 A * | 9/1999 | Sjostrom et al. .............. 95/134 |
| 6,258,334 B1 * | 7/2001 | Gadkaree et al. ............. 423/210 |
| 2005/0148465 A1 * | 7/2005 | Durante et al. .............. 502/401 |
| 2006/0029533 A1 * | 2/2006 | DeBerry ..................... 423/210 |
| 2007/0167309 A1 * | 7/2007 | Olson .......................... 502/27 |
| 2008/0006012 A1 * | 1/2008 | Friday et al. .................. 55/524 |

* cited by examiner

*Primary Examiner*—Timothy C Vanoy
(74) *Attorney, Agent, or Firm*—James B. Potts; Brian J. Lally; Paul A. Gottlieb

(57) ABSTRACT

The invention presents a device for the removal of elemental mercury from flue gas streams utilizing a layer of activated carbon particles contained within the filter fabric of a filter bag for use in a flue gas scrubbing system.

11 Claims, 4 Drawing Sheets

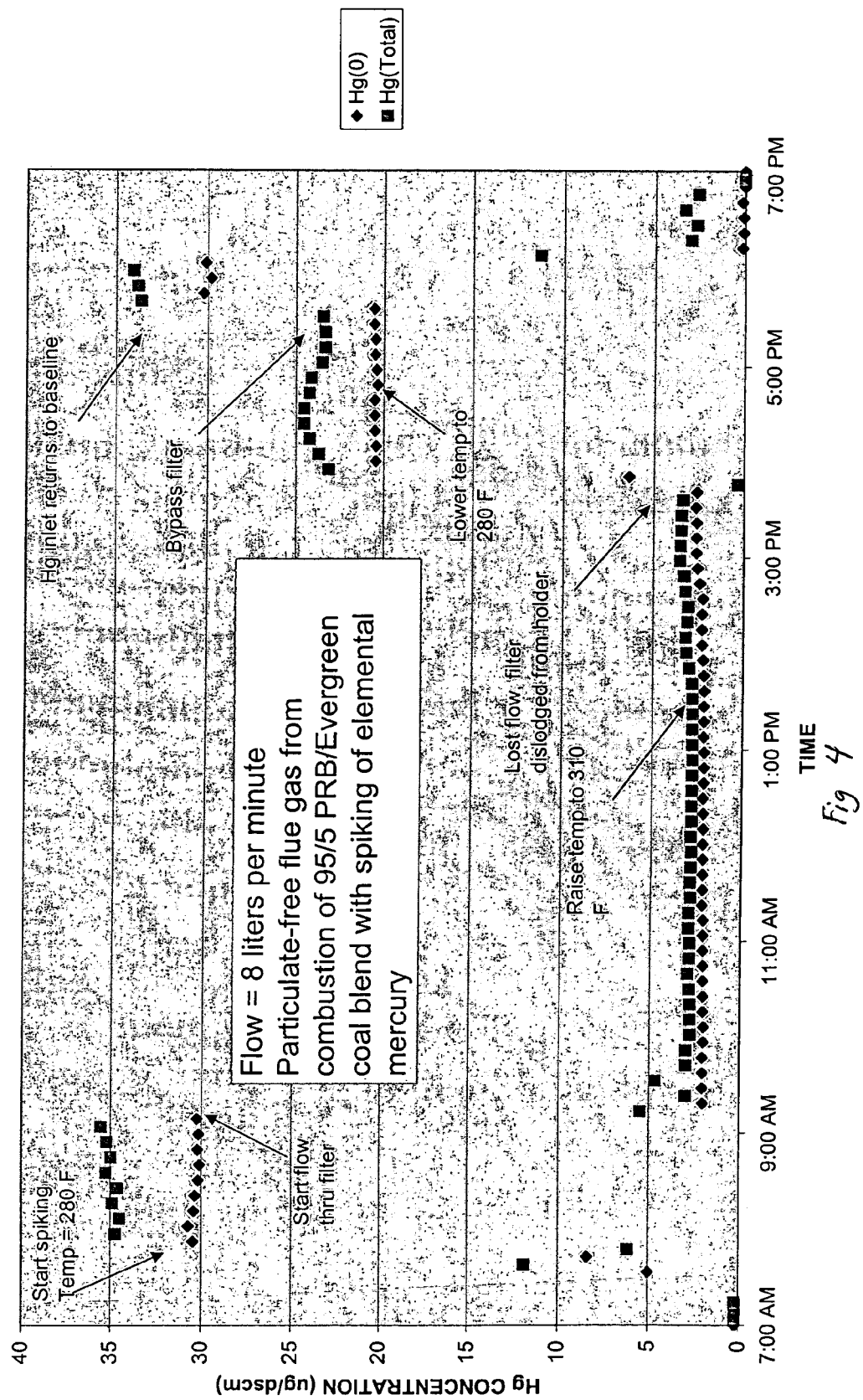

MERCURY SORBENT DELIVERY SYSTEM FOR FLUE GAS

The United States Government has rights in this invention pursuant to Agreement between National Energy Technology Laboratory and pursuant to the employer-employee relationship of the U.S. Department of Energy and the inventors.

FIELD OF THE INVENTION

The invention relates to a method for the treatment of combustion gases, and more specifically, this invention relates to a method utilizing sorbents to remove mercury (Hg) from high temperature gases generated from combustion sources such as coal gasifiers, coal-fired electrical generating plants, and ore smelters. Specifically, the present invention relates to the removal of mercury from flue gases produced by coal fired power generation facilities.

BACKGROUND OF THE INVENTION

Description of Related Art

Fuels, typically fossil fuels, are burned with air in a combustion chamber to generate energy. The energy released is used to heat a product or process, or to produce electricity. The fossil fuels normally used, such as coal or oil, contained sulfur and other impurities, including noxious gases and solids. When coal is burned, the products of combustion include particulate matter (commonly known as fly ash), sulfur dioxide ($SO_2$), nitrogen oxides ($NO_x$), vaporized heavy metals (including mercury), carbon dioxide and water. The products of combustion exit from the boiler as part of an exhaust stream known as flue gas. The technologies for removal of $SO_2$ and $NO_x$ from flue gases are well established. Technologies for the removal of mercury and mercuric compounds are not as well established. Coal-fired power plants currently emit about 40% of the total U.S. man-made mercury emissions and are thus being scrutinized for future controls. Recently, concerns over the hazards associated with heavy metals, in particular mercury, in the form of vapor and mercuric compounds, have increased due to public health issues and environmental hazards. The removal of mercury and mercuric-based compounds from flue gas is one of the major areas for flue gas clean up.

There are increasing concerns that air emissions from coal utilization, including gasification processes, will raise the level of mercury in the environment. Exposure to high levels of mercury has been associated with neurological and developmental effects in human beings. Concentrations of mercury in the air are usually at a low level and of less concern. Once mercury enters the waterways, it can accumulate in fish and sea mammals, causing potential harm to people who eat mercury-contaminated animals. Many industrial and combustion processes produce exhaust gases having low, but still significant, levels of mercury. For example, even if the concentration of mercury in coals is low, mercury emissions from coal-fired power plants have recently been determined to pose a significant hazard to public health, due to the large volume of exhaust gases produced. Thus, the reduction of mercury in the exhaust gas of industrial and combustion processes is of great importance.

The United States Environmental Protection Agency (EPA) intends to regulate coal-utilizing (gasifiers and combustors) facilities for mercury emissions. The Clear Skies Initiative, proposed in February 2002, would dramatically limit the emissions of mercury from all coal-utilizing facilities, including electrical generating plants.

There has been limited progress in removing of mercury from high temperature gas streams. As such, nearly all of the mercury in the coal ends up in the flue gases (~1 part per billion (ppb) concentration) after combustion and fuel gases (~3 ppb concentration).

It is known that exhaust gases emanating from industrial and combustion processes may contain mercury in elemental, oxidized, and particulate forms. Elemental mercury in exhaust gases does not adhere to soot and other particles entrained with the gases, but instead tends to remain in the vapor phase even after the exhaust gases are cooled to about 65° C. Therefore, at least a portion of elemental mercury in the exhaust gases is not recovered by conventional dust removal devices, such as electrostatic precipitators, fabric filters, or conventional scrubbers, and is instead released into the atmosphere.

Zeolites are widely used as absorbents, catalyst carriers, and filters. These compounds are framework silicates that contain aluminum as a substitute for a portion of the silicon atoms. Such a substitution results in a charge imbalance which is compensated for by the addition of an alkali or alkaline ion, such as sodium. This alkali or alkaline ion may be exchanged with other ions to produce different species of zeolites. Zeolite frameworks are arranged so that the crystal structure has cavities and pores on an atomic scale. Each species of zeolite has a specific composition and structure. Therefore, each species contains uniform pores of a specific size. Zeolites have a range of physical and chemical properties because of differences in their composition and structure.

U.S. Pat. No. 4,101,631 describes a process in which mercury vapor is selectively chemisorbed from gas streams by contact with zeolitic molecular sieves having elemental sulfur loaded thereon.

U.S. Pat. No. 5,659,110 describes a process for purifying exhaust gases produced by combusting waste materials which includes reacting the gases with a mixture containing naturally occurring zeolites to remove mercury and mercury compounds from the exhaust gases. The mixture contains 10 to 20% by weight mordenite and 60 to 70% clinoptilolite.

U.S. Pat. No. 6,974,565 describes the removal of impurities from flue gas by the injection of oxides of manganese into the flue gas stream.

U.S. Pat. No. 5,672,323 describes the injection of activated carbon in a flue gas for the removal of mercury. The carbon containing mercury is collected by an electrostatic precipitator. In order to remove a significant portion of the mercury present in the flue gas a large volume of activated carbon must be injected into the exhaust gases All the methods discussed in the patents referred to above may suffer from insufficient mercury removal efficiency or incomplete regeneration. Thus, there is need for an improved method that provides efficient mercury removal using an adsorbent that can be regenerated by a simple and an efficient method.

BRIEF SUMMARY OF THE INVENTION

An object of the present invention is to provide a metal-capturing active sorbent that overcomes many of the disadvantages of the prior art.

Another object of the present invention is to provide a process for mercury removal, the product of which is separate from other flue gas impurity removal processes. A feature of the invention is the utilization of active sorbents which relegate metal adsorption to the sorbents' exterior surface at a first lower temperature, but which allows for adsorption of metals into interior regions of the sorbent at a second higher temperature. An advantage is that the sorbent can be utilized to capture metals during various cycles of an effluent discharge.

These and other objectives of the invention, which will become apparent from the following description, have been achieved by a novel apparatus and process for the removal of mercury-based compounds from a primary flue gas stream, comprising, providing a source of flue gas containing mercury and mercury-based compounds; providing a mercury absorbing media comprising a fabric containment layer, and a mercury absorbent, passing the mercury containing flue gas through the mercury absorbing media, to produce a flue gas having a reduced concentration of mercury, processing the mercury reduced gas to remove other components. The mercury absorbing media can be contained between layers of fabric or embedded within the fabric membrane. The mercury sorbent can be iron, gold, palladium, silver, or carbon-based sorbent. Preferably, the mercury absorbing media is carbon-based, and in particular wherein the mercury absorbing media is activated carbon. The carbon particles can be activated or promoted by sulfur, chlorine, bromine, etc., before or after incorporation into the membrane.

Typically, flue gas containing mercury-based compounds has from about 1 to 35 μg/dscm (micrograms per dry standard cubic meter) of mercury. The higher level of mercury in the flue gas equates to 27 parts per billion on a weight basis. When converting to a volumetric (or molecule number basis) by using molecular weights, we get 3.9 parts per billion on a volume basis.

BRIEF DESCRIPTION OF THE SEVERAL VIEWS OF DRAWINGS

With this description of the invention, a detailed description follows with reference being made to the accompanying figures of drawings which form part of the specification, in which like parts are designated by the same reference numbers, and of which:

FIG. 4 is a graph of experimental results showing mercury concentration vs. time.

DETAILED DESCRIPTION OF THE INVENTION

Description of the Preferred Embodiment(s)

Figure 1:
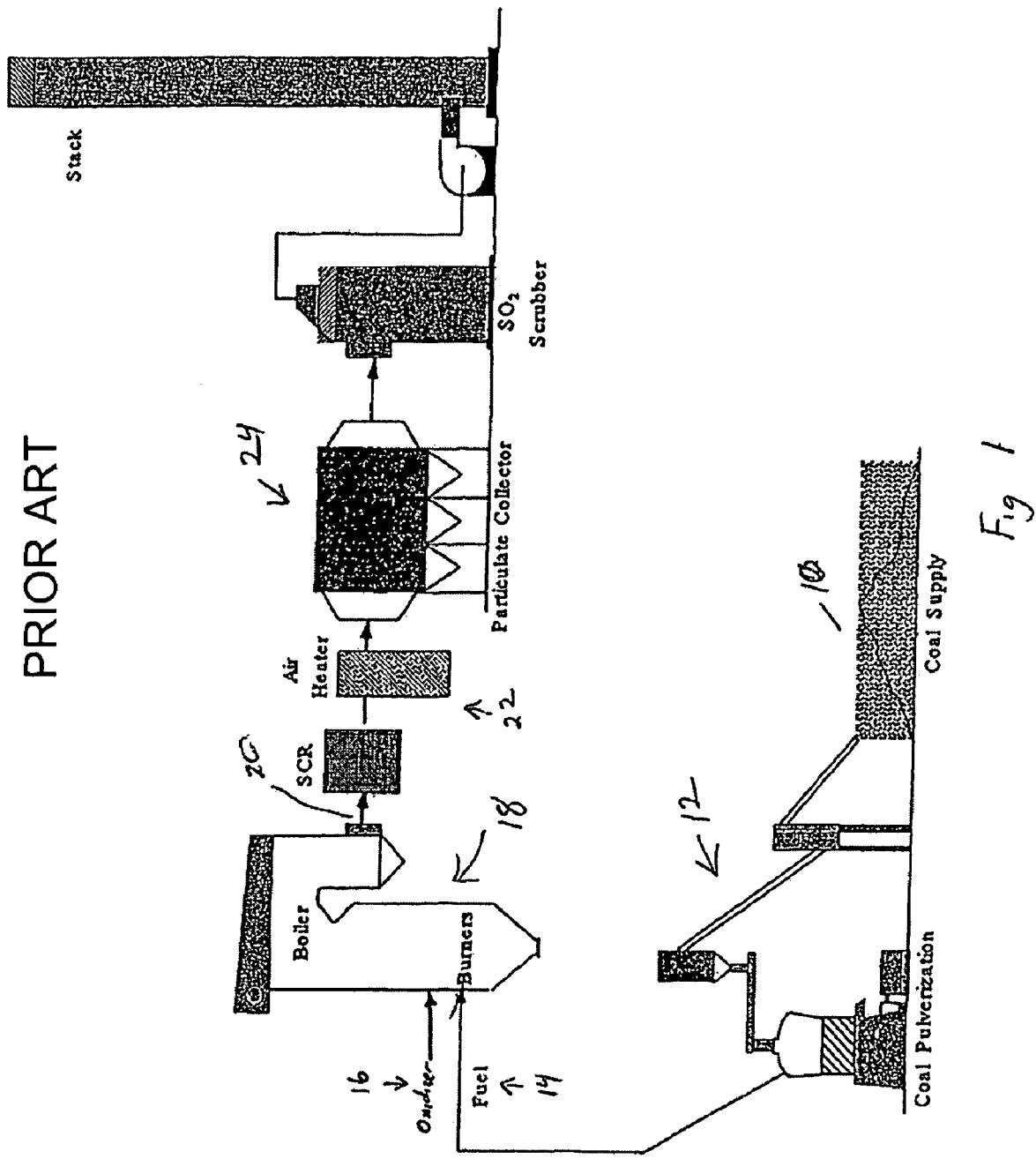
FIG. 1 is a schematic view of a typical combustion system for a power plant.

FIG. 1 illustrates a typical combustion system for use with the device of this invention. The combustion system provides a fuel source 10 and a fuel preparation process step 12. The prepared fuel 14 is combined with an oxidizer 16, typically air, and combusted in a combustion system 18. The flue gas 20 is processed through a heat recovery system 22 and enters a particulate removal system (device) 24. The mercury removal system of this invention is integrated within the particle removal system 24. This system is shown in greater detail in FIG. 2.

Figure 2:
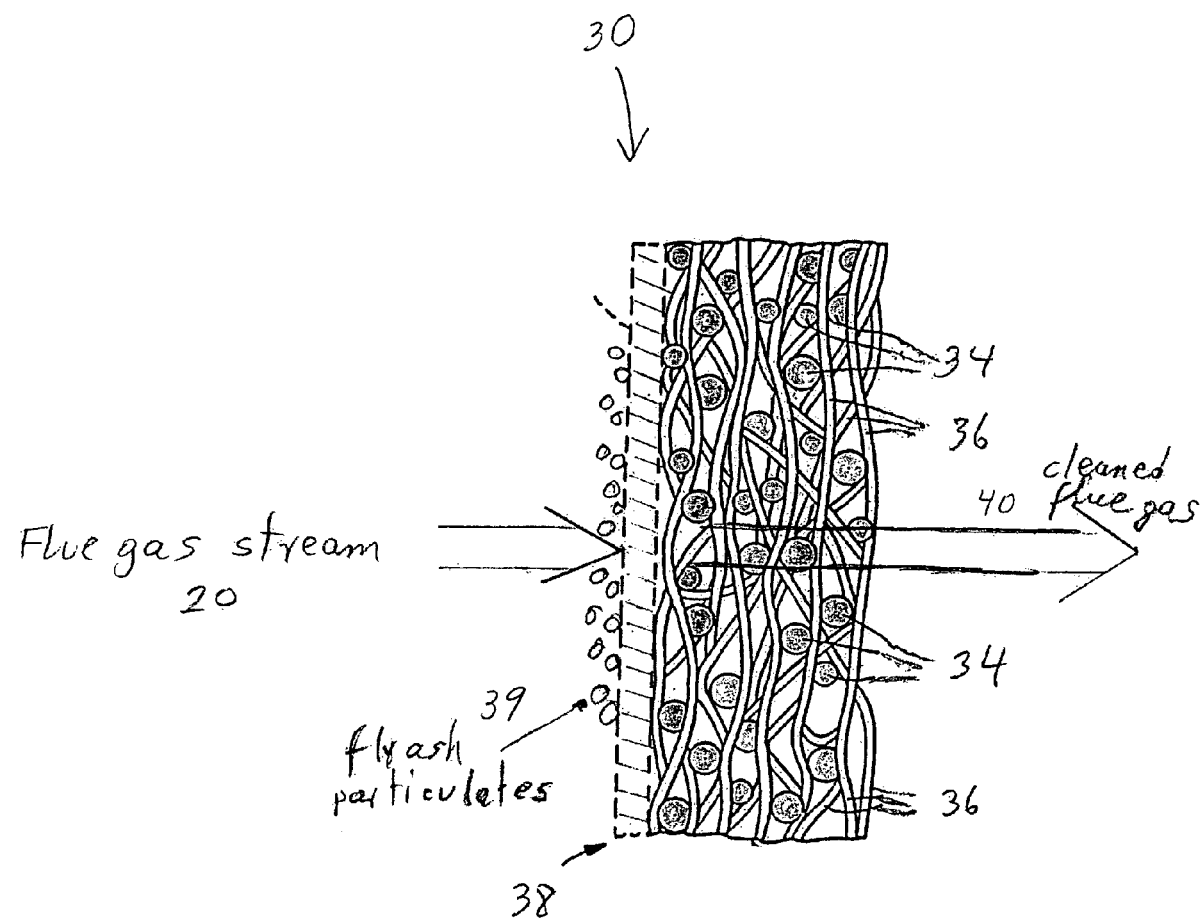
FIG. 2 is a cross-sectional view of a filter bag containing the absorptive media.
Figure 3:
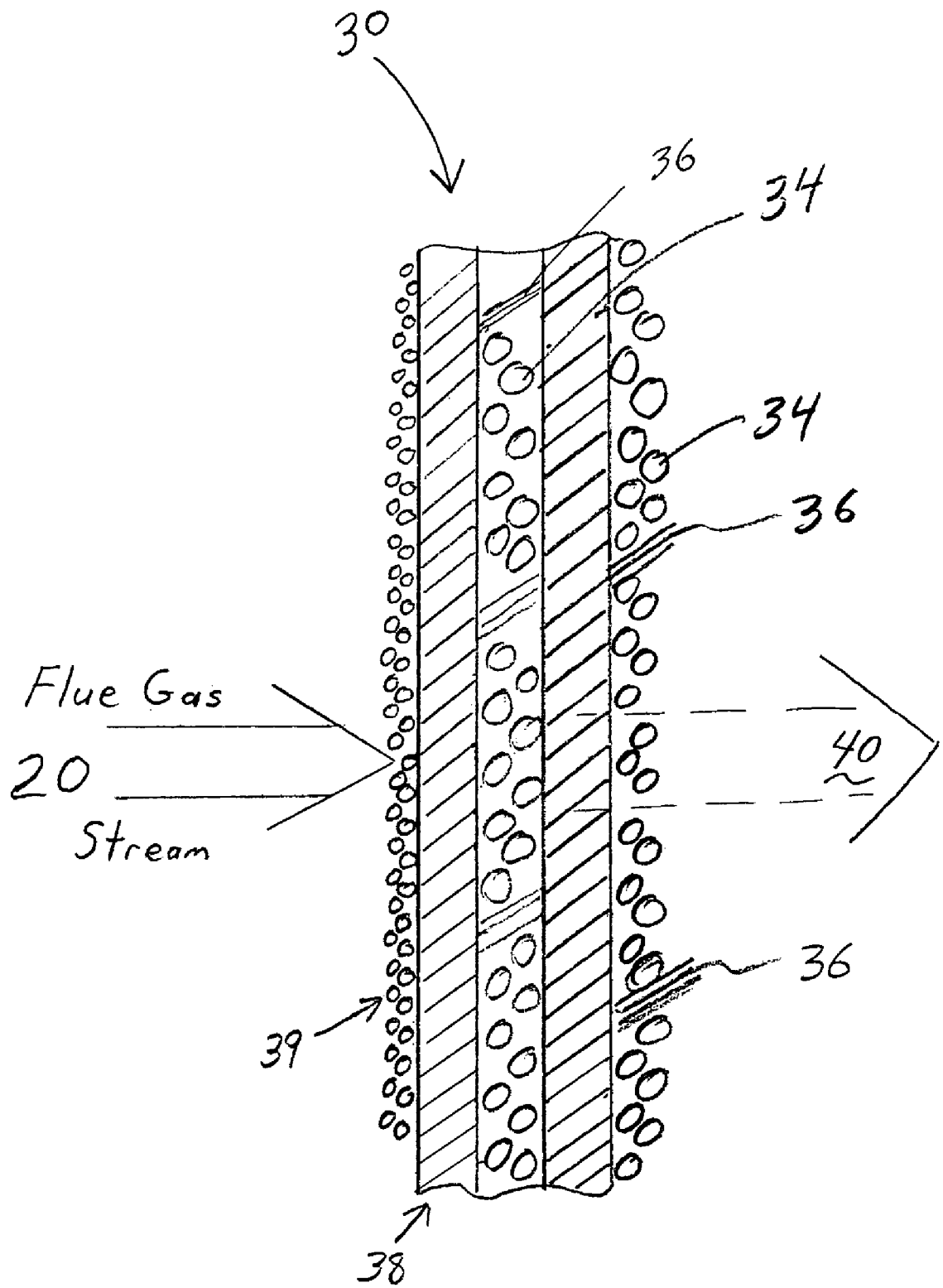
FIG. 3 is a cross-sectional view of an alternative filter bag containing the absorptive media.

FIG. 2 illustrates the mercury removal system for use with this system at 30. The flue gas stream 20 enters the particle removal system 24 (FIG. 1) and passes through a series of filter bag 32 containing a mercury adsorbent 34. The adsorbent 34 can be held between multiple layers of the filter fabric 36. Alternatively, the adsorbent may be contained or trapped within a fibrous layer, as shown in FIG. 3.

As the mercury containing flue gas stream 20 passes through the layers from which the filter bag 32 is fabricated, the first upstream layer 38 removes particulate 39 not removed by a cyclonic separator or other coarse particle removal system. The first upstream layer 38 may be fabricated for a material such as a polytetrafluoroethylene (PTFE) membrane or an expanded PTFE membrane such as TETRA-TEX®. As the reduced particle flue gas 40 loading enters the mercury adsorbent 34 media the mercury adsorbent removes elemental mercury vapor from the cleaned flue gas 40. To efficiently remove a substantial portion (>90% by wt.) of elemental mercury vapor multiple layers of adsorbent may be required; as shown in FIG. 3.

The preferred adsorbent for use with this invention is an activated carbon particle having a particle size of less than 60 μm and preferably a particle size from about 2 μm to about 30 μm. Further, the particles of carbon should be activated for fast absorption and high loading. Examples of promoters for use to activate the carbon include sulfur, selenium, chlorine, and bromine. For a given mass of adsorbent, their small size effectively reduces mass transfer resistance by decreasing capture distance (increase in particle number density that the gas stream encounters) and reducing pore diffusion limitations. The membrane/cloth supporting matrix maintains a commercially viable pressure drop across these elemental mercury absorbents while at the same time providing an effective means for delivery of the adsorbent and its subsequent removal from the flue gas stream.

The capture of fly ash separate from mercury is a key feature of this invention. This approach reduces cross contamination of other impurities, such as fly ash, that must also be removed from the flue gas. With other impurities, such as mercury, separated from the fly ash, the ash can be sold as a concrete amendment (no contamination by the activated carbon and any captured mercury on it when it is injected directly into the flue gas as in competing concepts and both types of particulates are collected together in the same bag house).

Experimental Results

The particle-loaded membranes proposed here for contaminant removal from gas streams are similar to membranes utilized for water filtration, such as Empore™ manufactured by 3M Corporation.

A commercial 3M Empore® carbon disk (carbon particle-loaded membrane) was tested as a mercury sorbent delivery system in a flue gas slip stream out of NETL's 500-lb/h pulverized coal-fired combustion unit. The detailed features of the combustion system have been published (18). About 8 liters/minute of the flue gas, arising from the combustion of a 95/5% PRB/Evergreen coal blend, were passed through the Empore™ carbon filter, being held at 280-310 F, for about six hours. The average dry flue gas composition was:

O2—8.4%

CO2—11.1%

SO2—260 ppm

NOx—340 ppm

CO—8 ppm

The background mercury concentration in the entering flue gas, arising from the feed coals, was supplemented by spiking with hard-to-remove elemental mercury. The total average mercury concentration in the flue gas was about 35 μg/dscm (micrograms per dry standard cubic meter) of mercury. This level of mercury in the flue gas equates to 27 parts per billion on a weight basis. When converting to a volumetric (or molecule number basis) by using molecular weights, we get 3.9 parts per billion on a volume basis. The elemental mercury concentration was about 30 µg/dscm. The carbon particle-loaded membrane removed about 92% of the inlet mercury (comprising about 86% $Hg^0$) as measured by P.S. Analytical's Sir Galahad continuous emission monitor. The experimental data is shown in FIG. 4. It is noted that the absorption was consistently very high and smooth. These results are contrasted with the sawtooth type performance typically observed in competing duct injection technologies. In the latter, the mercury absorption deteriorates substantially after each bag cleaning cycle that dislodges the accumulation of sorbent on the bag. Cycling between 70% and 90% absorption has been reported (19).

Some utility systems may find it more suitable to use particle-loaded membranes as a means to oxidize elemental mercury into easier-to-capture oxidized mercury forms, especially when wet scrubbers already exist as an APCD. Experimental results show that the activated carbons employable in particle-loaded membranes will convert the entering mercury to the oxidized form once their absorption capacity has been exceeded (17). In this application, high mercury absorption capacity is not an issue, nor is maintenance of 'catalytic activity.' The advantage of superior contact with the mercury target species facilitated by the particle-loaded membranes is maintained.

In some situations it may be advantageous to expedite the conversion of elemental mercury to the oxidized type and subsequent breakthrough of the oxidized mercury through the bag material by injection of small amounts of an oxidant such as nitrogen dioxide ($NO_2$) into the flue gas stream ahead of the mercury absorbing media in the bag house. Only about 20 ppm of $NO_2$ is needed to accomplish the mercury oxidation in the presence of acid gases such as $SO_2$ normally already found in flue gas when high-sulfur coal is burned.

The activated carbon for use with this invention should have an average surface area of about 1100 $m^2/gm$ and preferably between 800 and 1200 $m^2/gm$. The activated carbon for use with this invention should have an average size of less than 60 µm (microns) and preferably less than 30 µm.

Thus, in accordance with the invention, there has been provided a metal-capturing active sorbent that overcomes many of the disadvantages of the prior art. There has also been provided a process for mercury removal, the product of which is separate from other flue gas impurity removal processes.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appended claims.

I claim:

1. A conversion process for the removal of mercuric-based compounds from a primary flue gas stream:
   providing a source of flue gas containing mercury and mercuric-based compounds,
   providing a mercury absorbing media comprising a fabric containment layer, and a mercury absorbent,
   providing a source of $NO_2$ into the flue gas stream upstream of the mercury absorbing media,
   passing the mercury containing flue gas through the mercury absorbing media, thereby producing mercuric oxide,
   processing the flue gas to remove the mercuric oxide and other components.

2. The conversion process of claim 1, wherein the mercury absorbing media is carbon-based.

3. The conversion process of claim 2, wherein the mercury absorbing media is activated carbon.

4. The conversion process of claim 2, wherein the carbon-based sorbent is promoted with sulfur, chlorine, or bromine.

5. The conversion process of claim 1, wherein the source of mercury containing flue gas contains from about 1 to 30 ppb of mercury.

6. The conversion process of claim 1, wherein the mercury in the form of mercury and mercuric-based compounds in the mercury reduced gas is less than 20 percent of the mercury present in the flue gas.

7. The conversion process of claim 1 wherein the mercury capture efficiency is improved by the use of mercury absorbing media having an average particle size of less than 20 µm.

8. The conversion process of claim 1 wherein the elemental mercury is converted into the oxidized form.

9. The process of claim 1, wherein a $NO_2$ precursor is injected into the flue gas to provide a source of $NO_2$.

10. The process of claim 1, wherein processing the flue gas to remove the mercuric oxide and other components is conducted using a wet scrubber.

11. The process of claim 1, wherein the mercury containing flue gas is passed through the mercury absorbing media by passing the mercury containing flue gas through the fabric containment layer then through the mercury absorbent.

* * * * *